(12) United States Patent
Döhring

(10) Patent No.: US 11,149,447 B2
(45) Date of Patent: *Oct. 19, 2021

(54) PVC-PLASTIC PANEL

(71) Applicant: Xylo Technologies AG, Niederteufen (CH)

(72) Inventor: Dieter Döhring, Großenhain (DE)

(73) Assignee: Xylo Technologies AG, Niederteufen (CH)

(*) Notice: Subject to any disclaimer, the term of this patent is extended or adjusted under 35 U.S.C. 154(b) by 0 days.

This patent is subject to a terminal disclaimer.

(21) Appl. No.: 16/482,917

(22) PCT Filed: Feb. 3, 2017

(86) PCT No.: PCT/EP2017/052369
§ 371 (c)(1),
(2) Date: Aug. 1, 2019

(87) PCT Pub. No.: WO2018/141400
PCT Pub. Date: Aug. 9, 2018

(65) Prior Publication Data
US 2019/0360215 A1    Nov. 28, 2019

(51) Int. Cl.
*B32B 3/00* (2006.01)
*E04F 15/10* (2006.01)
(Continued)

(52) U.S. Cl.
CPC .............. *E04F 15/107* (2013.01); *B05D 1/36* (2013.01); *B05D 1/40* (2013.01); *B05D 3/067* (2013.01); *B05D 7/04* (2013.01); *B32B 27/08* (2013.01); *B32B 27/304* (2013.01); *B44C 5/0453* (2013.01); *B44C 5/0476* (2013.01); *E04F 13/077* (2013.01); *B32B 2255/10* (2013.01); *B32B 2255/26* (2013.01);
(Continued)

(58) Field of Classification Search
CPC ............................... E04F 15/107; E04F 13/00
See application file for complete search history.

(56) References Cited

U.S. PATENT DOCUMENTS 10,668,703 B2 * 6/2020 Duyck .................... B32B 37/02
2011/0296780 A1   12/2011 Windmöller
2016/0136913 A1    5/2016 Hannig

FOREIGN PATENT DOCUMENTS

CN    104245350 A    12/2014
DE    197 02 476 A1    7/1998
(Continued)

OTHER PUBLICATIONS

International Search Report and Written Opinion for corresponding Patent Application No. PCT/EP2017/052369 dated Oct. 18, 2017.
(Continued)

*Primary Examiner* — Elizabeth E Mulvaney
(74) *Attorney, Agent, or Firm* — Renner, Otto, Boisselle & Sklar, LLP

(57) ABSTRACT

The present invention relates to a panel, in particular a wall, ceiling or floor panel, comprising a carrier plate (12) based on polyvinyl chloride with a density of, for example, 900 to 2,500 kg/m³ and a film (17) applied thereon. The film is a thin PVC-film and comprises a decorative pattern (18) directly printed thereon.

19 Claims, 2 Drawing Sheets

Figure 1:
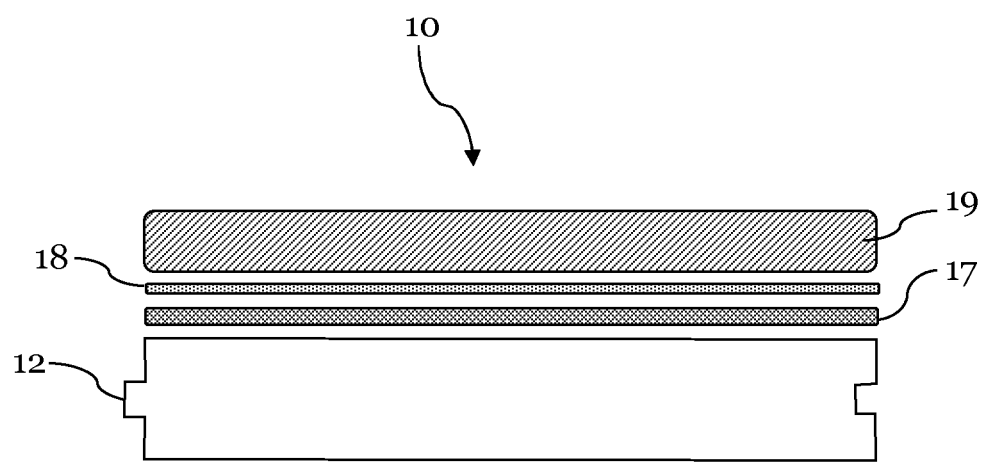

(51) Int. Cl.
*B05D 1/36* (2006.01)
*B05D 1/40* (2006.01)
*B05D 3/06* (2006.01)
*B05D 7/04* (2006.01)
*B44C 5/04* (2006.01)
*E04F 13/077* (2006.01)
*B32B 27/08* (2006.01)
*B32B 27/30* (2006.01)
*B44F 9/02* (2006.01)
*B44F 9/04* (2006.01)
*E04F 15/02* (2006.01)

(52) U.S. Cl.
CPC ... *B32B 2307/536* (2013.01); *B32B 2307/732* (2013.01); *B32B 2419/00* (2013.01); *B32B 2607/00* (2013.01); *B44C 5/0461* (2013.01); *B44F 9/02* (2013.01); *B44F 9/04* (2013.01); *E04F 15/02038* (2013.01)

(56) References Cited

FOREIGN PATENT DOCUMENTS

| | | |
|---|---|---|
| DE | 10 2006 029 963 A1 | 1/2008 |
| DE | 10 2006 058 655 A1 | 6/2008 |
| DE | 10 2010 011602 A1 | 9/2011 |
| DE | 10 2010 011 602 B4 | 10/2013 |
| FR | 2 805 548 A1 | 8/2001 |
| RU | 2587552 C2 | 6/2016 |
| UA | 115101 C2 | 9/2017 |
| WO | 2008/061791 A1 | 5/2008 |
| WO | 2014/202144 A1 | 12/2014 |

OTHER PUBLICATIONS

International Preliminary Examination Report for corresponding Patent Application No. PCT/EP2017/052369 dated Feb. 5, 2019.
Chinese Office Action and translation for corresponding Chinese Patent Application No. 201780085471.9 dated Sep. 3, 2020.
Belorussian Office Action and translation for corresponding Belorussian Patent Application No. a 20190256 dated Sep. 17, 2020.
Original and English Translation of Granting Decision for corresponding Ukrainian Application No. a 2019 09626, dated Feb. 12, 2021.
Original European Search Report issued for corresponding European Patent Application No. 21151732.1, dated May 4, 2021.

* cited by examiner

PVC-PLASTIC PANEL

1. FIELD OF THE INVENTION

The present invention concerns an improved panel, in particular a wall, ceiling or floor panel, based on a hard PVC (PVC-U) carrier plate, and a method for its manufacture.

2. BACKGROUND OF THE INVENTION

Polyvinyl chloride has long been used in the manufacture of floor coverings. Polyvinyl chloride (PVC) is a thermoplastic material that is hard and brittle without the addition of additives. However, the mechanical properties of PVC can be adjusted over a wide range by adding suitable auxiliary materials such as plasticizers, fillers, colorants, stabilizers, etc. For this reason, the term "PVC" in this document does not refer to pure polyvinyl chloride, but to PVC with the additives normally added and necessary for practical use, unless otherwise specified.

A typical example from the state of the art is described in the publication DE 10 2006 058 655 A1. This publication discloses a floor panel in the form of a multi-layer rectangular laminate with a carrier plate made of a soft polyvinyl chloride and a décor paper layer arranged on top of the polyvinyl chloride layer. The application of a décor paper sheet is technically complex and involves considerable costs.

From DE 10 2006 029 963 A1 a floor covering made of polyvinyl chloride is known, which is coated with a hard-wearing lacquer layer in order to improve the durability of the PVC floor covering. The lacquer layer is based on an acrylate resin and is to be cured with radiation. The core of this publication lies in the addition of electrically conductive substances to the acrylate resin to provide the finished floor covering with antistatic and/or electrically conductive properties.

The WO 2008/061791 A1 of the same applicant represents a further development of a lacquer coating. The content of this publication is hereby incorporated in its entirety by reference. The core of the improvement of this publication lies in the fact that two liquid, different polymer layers are applied wet-on-wet to the surface of a panel, so that a partial mixing of the coating agents takes place. These two wet-on-wet coatings are then cured together, with the cured resulting coating having a hardness gradient due to partial mixing, with the hardness of the coating decreasing with increasing depth from the surface of the resulting coating.

In the light of these well-known PVC coverings, the present invention has the task of providing a panel, in particular a wall, ceiling or floor panel, comprising a carrier plate made of (in particular) hard PVC, which is to be produced in a cheaper and simpler way than is known, for example, from DE 10 2006 058 655 A1. Another task is to provide such a panel that has improved durability and high quality decorative patterns.

These and other tasks, which are still mentioned when reading this description or can be identified by an expert, are solved by a panel according to Claim 1 and a method for its manufacture according to Claim 18.

3. DETAILED DESCRIPTION OF THE INVENTION

According to the present invention, a panel is provided comprising a carrier plate based on polyvinyl chloride and a film attached thereto, wherein the film is a PVC film having a thickness of 0.04 to 0.2 mm and comprising a decorative pattern directly printed thereon, and a cured polymer layer is provided over the PVC film. The polymer layer is generally preferably based on a polymerizable resin, in particular an acrylate resin. In general, the cured polymer layer prefers a hardness gradient according to the WO 2008/061791 of the same applicant described at the beginning.

The carrier plate based on polyvinyl chloride consists in general preferably of hard PVC (also referred to as PVC-U), i.e. it essentially contains no or no plasticizers.

In contrast to the above-mentioned state of the art DE 10 2006 058 655 A1, the present invention provides a panel that does not require a separate décor paper, as the decorative pattern is printed directly onto the PVC film. The PVC film has the advantage that it is possible to dispense with expensive pre-treatment of the carrier plate (although pre-treatment is of course possible, should this be desired). In particular, there is no need to grind the surface of the carrier plate, and the application of fillers and primers, which is typically necessary in the state of the art, can also be advantageously omitted if a PVC film is used in the thickness in accordance with the invention.

In a preferred embodiment, the polymer layer comprises a hardness gradient, so that the hardness of the polymer layer decreases essentially continuously with increasing depth as seen from the surface of the polymer layer. Such a layer with a hardness gradient is advantageous in combination with the relatively soft PVC film and, among other things, achieves good sound insulation.

The printing ink used for printing the decorative pattern is solvent based and preferably a UV printing ink. Such printing inks slightly dissolve the surface of the PVC film, resulting in a firm anchorage of the printing ink on the film. The use of UV inks also results in very good cross-linking of the ink with the surface of the PVC film. UV inks are therefore particularly preferred because they contain reactive solvents that are chemically incorporated into the later network, such as N-vinylcaprolactam.

Preferably a polymerizable printing ink (die) is therefore used for printing the decorative pattern, in particular based on polymerizable acrylic resins and/or N-vinylcaprolactam (a liquid reactive diluent) as offered by the company BASF. The applicants have surprisingly found that improved adhesion properties of the layer system can be achieved by using polymerizable printing inks instead of the common water-based emulsion inks. This applies in particular to the preferred application with a polymer layer, especially with a hardness gradient. Suitable weight proportions for the amount of polymerizable acrylate and N-vinylcaprolactam in the ink have been found to be 2 to 50, more preferred 5 to 40 and most preferred 10 to 30%. These values refer to the sum of acrylate and N-vinylcaprolactam. The proportion by weight of N-vinylcaprolactam in the printing ink, for example, is 3 to 12%.

The positive effect is particularly noticeable if the printing ink of the décor layer (i.e. the decorative pattern) and the polymer layer are cured or polymerised together (if the décor layer is printed directly on, as in digital printing, the décor layer virtually consists of the printing ink). Curing of a polymer layer or a polymerizable printing ink (such as polymerizable acrylates or UV-reactive inks in general) is understood to mean the chemical reaction that takes place during polymerization. The joint curing (polymerization) of the polymerizable components (acrylate systems and/or N-vinylcaprolactam) of the ink and polymer layer results in chemical crosslinking at the interface of the two layers, which is assumed to be responsible for the improved adhesion of the layers.

Polymerizable components, which are preferably used in the present invention, include acrylates as their main components, in particular acrylate monomers, oligomers and optional photoinitiators, but also N-vinylcaprolactam as a liquid reactive diluent. N-vinylcaprolactam can be added to the printing ink as a thinner in addition to the acrylates and polymerizes together with these. Alternatively, it is also possible to dispense with the acrylates and provide a correspondingly larger amount of N-vinylcaprolactam, since the N-vinylcaprolactam itself can be polymerized. Details on this are known to the expert from the German publication DE 197 02 476 A1. In preferred embodiments, the polymerizable components therefore essentially consist of N-vinylcaprolactam. The photoinitiators effect a polymerisation of the monomers or oligomers under the influence of radiation, whereby the printing ink cures quickly.

Preferably the PVC film has a thickness from 0.05 to 0.15 mm, more preferably from 0.06 to 0.095 mm. Such thicknesses can be processed very well and especially applied with a calender. For example, the PVC film can be applied directly using a heated calender so that the film is thermally bonded/fused to the carrier plate. The use of an additional adhesive to attach the film to the carrier plate is then not necessary, although this is possible alternatively or additionally of course.

Preferably the carrier plate based on polyvinyl chloride has a density of 900 to 2,500 kg/m$^3$, preferably 1,000 to 2,200 kg/m$^3$, more preferably 1,300 to 1,950 kg/m$^3$ and most preferably 1,350 to 1,500 kg/m$^3$. Such densities result in very robust and resistant plates, which are particularly advantageous when panels are used as floor coverings. In addition, these plates allow the incorporation of locking or coupling elements at the side edges of the plate, e.g. in order to be able to connect several similar plates with each other in a form-fitting manner.

A thickness (strength) for the carrier plate between 3 and 20 mm, preferably between 4 and 15 mm, more preferably between 3 and 12 mm and most preferably between 4 and 10 mm has proved to be advantageous. It has been found that these areas provide sufficient stability for the thickness of the carrier plate during the manufacturing process and also provide sufficient impact sound absorption (when used as flooring) and dimensional stability of the finished panel.

In a preferred embodiment, a layer comprising a UV primer is provided on the PVC film. This layer preferably has a surface mass of 1 to 20 g/m$^2$, more preferably 2 to 15 g/m$^2$, and most preferably 2 to 5 g/m$^2$. Dipropylene glycol diacrylate has proven to be a suitable material, e.g. in an amount of 2 g/m$^2$ it has a good effect. The primer is preferably applied to the printing ink and thus improves the adhesion between the printing ink, the substrate and the polymer layer. It has been shown that especially in areas with little ink the adhesion is improved by using the primer.

The carrier plate is generally preferably an extruded PVC plate.

In a preferred embodiment, abrasion-resistant particles, especially corundum particles, with an average diameter of 10 to 100 µm, preferably 20 to 80 µm, more preferably 25 to 70 µm and especially 30 to 60 µm are embedded in the polymer layer. The abrasion-resistant particles make it possible to considerably increase the lifetime of a panel according to the invention.

In a preferred embodiment, the decorative pattern, which is applied directly to the PVC film using a digital printing process, represents the only décor layer of the panel according to the invention, i.e. no further décor papers or décor films are provided. There is therefore no need to provide a separate décor paper or the like, which leads to a considerable reduction in costs and simplification of the manufacturing process for a panel according to the invention.

According to this invention, a method of manufacturing a panel, in particular a wall, ceiling or floor panel, is also provided.

As mentioned at the beginning, according to a preferred embodiment of the invention, the printing ink of the décor layer (of the decorative pattern) is cured (polymerised) together with the polymer layer applied over it, preferably by irradiating it together. This results in a partial chemical crosslinking of the polymers used at the interface between the printing ink and the polymer layer(s) applied above it. It has been shown that a particularly good adhesion of the polymer layer to the carrier plate can be achieved.

In a first step (step i) of this method, a carrier plate based on polyvinyl chloride with a density of 900 to 2,500 kg/m$^3$ is provided. The carrier plate preferably consists of a hard PVC. A PVC film having a thickness of 0.04 to 0.2 mm is then (ii) applied to this carrier plate by means of a calender and afterwards (iii) a decorative pattern is printed on the PVC film.

After printing the decorative pattern on the PVC film, a liquid first polymer layer is applied to the primer layer (iv). In a further step, the polymer layer is cured, preferably together with the printing ink (vi). Optionally, at least a second polymer layer can be applied in liquid form to the still wet first polymer layer (v) so that the coating agents are partially mixed. The curing of the printing ink and the polymer layer(s) can take place in one method step but also successively in two separate method steps. Hardening or curing of a polymer layer is understood to be the chemical reaction that takes place during polymerization. A distinction must be made between this and the drying of such layers, in which only the water content is reduced or removed.

Preferably steps (iv) to (vi) are performed such that the cured polymer layer has a hardness gradient, wherein the hardness of the coating decreases with increasing depth as seen from the surface of the resulting coating. This process is described in more detail in the WO 2008/061791 A1 mentioned at the beginning, so that no further details are given here.

Preferably, a heated calender is used in such a way that the PVC film is thermally welded to the carrier layer. In this way, the film can be applied and fastened easily and safely in a single step.

Furthermore, the directly printed decorative pattern preferably imitates a wood, stone or tile surface. The PVC film is generally preferred unicoloured or white. This provides a good background colour for most commercially used décors.

In the following, the invention will be explained in more detail using two non-restrictive examples:

Reference Example: "Panel with Conventional Indirect Gravure Printing"

A PVC carrier plate with a thickness of 4 mm is first provided with a primer based on a commercially available aqueous acrylic dispersion via a roller applicator. In the next step, the PVC carrier plate is smoothed by a roller applicator using a smoothing compound based on a highly filled aqueous acrylate dispersion. Subsequently, a primer based on an aqueous acrylate dispersion mixed with fillers and colour pigments is applied by casting. After each of these coating steps, intermediate drying is carried out at temperatures between 80 and 200° C. The PVC carriers treated in this way are supplied to a printing machine essentially consisting of an engraving roller and a rubber roller for transferring the print image from the engraving cylinder to the plate. The print image is produced by 3 downstream printing units, whereby each printing unit applies its own printing ink consisting of ink pigments and an aqueous acrylic dispersion. For example, if a dark walnut wood is imitated, 5 g/m$^2$ of printing ink is applied. A commercial UV primer is then applied to the ink layer via a roller applicator. Finally, the polymer layer is applied as described in WO 2008/061791 to produce a polymer layer with a hardness gradient.

Example 2: "Panels where the Pattern is Printed on a PVC Film"

A 6 mm thick PVC carrier plate made of hard PVC is used and a PVC film with a thickness of 0.03 mm is applied to it using a heated calender, so that the film is thermally welded to the carrier plate. On the attached PVC film, the same décor image as in example 1 is produced using a digital printer. However, a solvent-based, UV-curing digital printing ink is used. To produce the printed image, a quantity of ink of about 2 g/m$^2$ is required. The ink is first fixed with 150 mJ/cm$^2$ (mercury). Then 2 g/m$^2$ of a first UV-curing layer is applied, which mainly contains dipropylene glycol diacrylate. On this non-irradiated layer a double bond containing oligomer mixed with photoinitiators is applied. The compound is then irradiated with a UV radiation source and the polymerisable components are cured. The resulting polymer layer comprises the printing ink and all layers above it.

4. DESCRIPTION OF PREFERRED EMBODIMENTS

Figure 2:
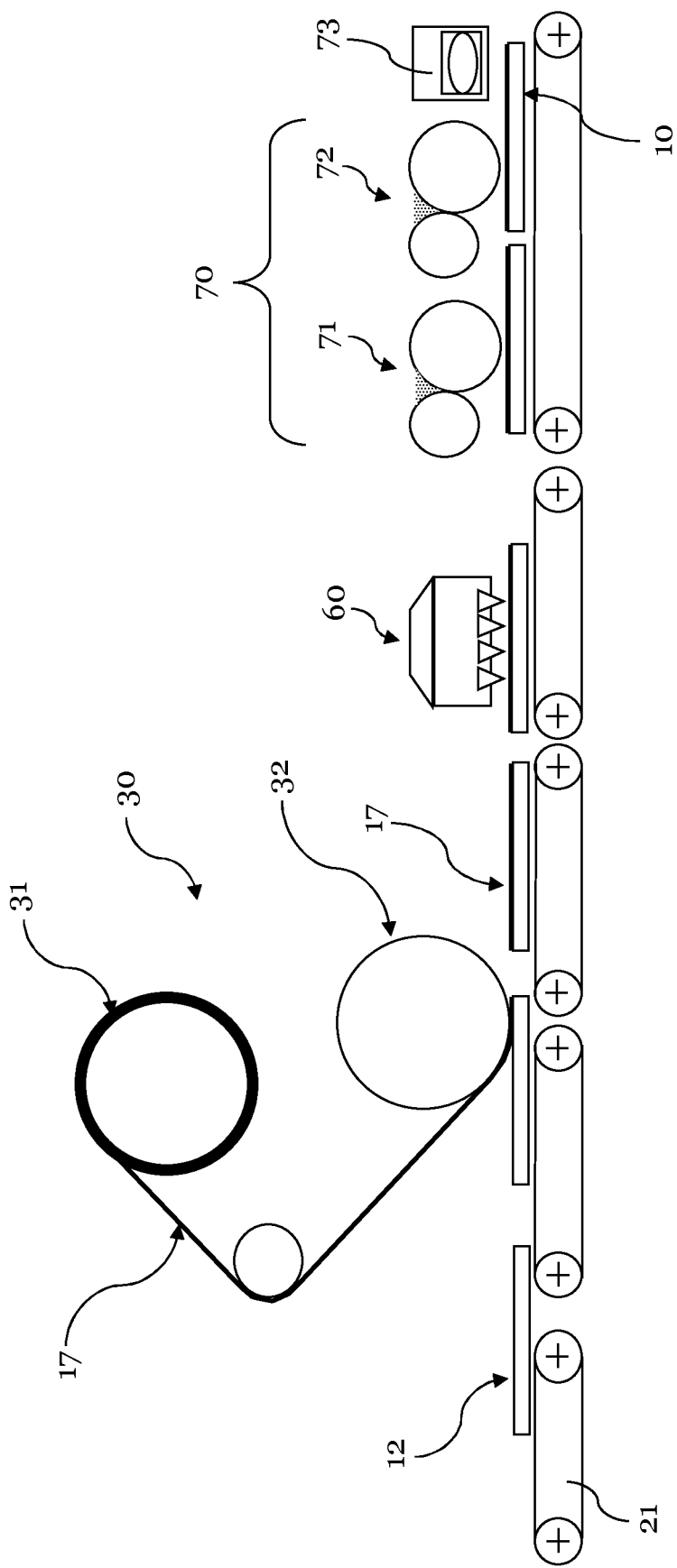

In the following, the invention is explained in more detail using the figure, wherein:

FIG. 1 shows a schematic representation of a panel to according to the invention with a polyvinyl chloride carrier plate 12; and FIG. 2 shows a schematic view of a device for coating.

In FIG. 1 the carrier plate 12 is shown, which has tongue and groove connections at its respective edges, which allow individual panels 10 to be connected with each other. The carrier plate consists of an extruded hard PVC (PVC-U).

Above the carrier plate 12 a PVC film 17 is arranged. A decorative pattern (décor layer) 18 is printed on the top side of film 17, preferably by means of a digital printing process. This decorative pattern can be any pattern, depending on the application. Above the PVC film and the décor layer, a UV-curable polymer layer system 19 is provided. The illustration is not true to scale and the layers are shown here at a distance from each other not present in the real product in order to make them more clearly visible. In particular, the plate 12 is considerably thicker than the layers applied to it, namely in the range of several mm, whereas the layers applied to it represent only a fraction of a mm in total.

In the following, FIG. 2 is used as an example to describe the manufacture of a panel according to the invention or the method according to the invention. FIG. 2 schematically shows a coating device for the coating of plates 12 or for the production of panels 10. The plates 12 are made of hard PVC with a thickness of 4-8 mm. The plates 12 are guided by a roller conveyor 21 through the various stations of the coating device. The coating stations shown are not to be understood conclusively, but serve only as examples to explain the method according to the invention and are shown purely schematically. In front of, behind and between the stations shown, further processing stations may be provided, such as further drying stations, stations for applying primers, stations for applying fillers, etc. The first station 30 is intended to be a calender unit used to apply the PVC film 17 to the top of the plates 12. The film is unwound from a supply roll 31 and attached to the top of the plates 12 by a heated calender roll 32. The film is cut to size using suitable cutting means known to a person skilled in the art (not shown).

In Station 60, a decorative décor, in particular a real wood décor, is printed on PVC film 17 using digital printing. After printing, a polymer layer is applied in the coating station 70. The polymer layer is applied with a hardness gradient, so that the hardness of the polymer layer decreases essentially continuously with increasing depth as seen from the surface of the polymer layer. For this purpose, a first polymer layer based on a polymerizable acrylate system is applied in a first coating unit 71. A further wet-on-wet polymer layer is applied to this first polymer layer in Station 72. The second polymer layer, for example, has a higher double bond content, as described in detail in the above-mentioned application on the hardness gradient. The two polymer layers are applied wet-on-wet in stations 71 and 72, so that partial mixing occurs at the interface of the two layers. In Station 73, the two polymer layers are cured together under the influence of UV radiation.

Station 60 is preferably a digital printing station and uses a printing ink based on a polymerizable acrylate. In this case, it is preferable that no curing of the ink takes place between stations 60 and 70, but at most an intermediate drying step during which some moisture is removed from the polymerizable acrylate of the ink. In the curing station 73, the printing ink and the first and second polymer layers are then cured together, resulting in a particularly resistant surface.

The invention claimed is:

1. A panel comprising a carrier plate based on polyvinyl chloride and a film attached thereto, wherein the film is a PVC film having a thickness of 0.04 to 0.2 mm and comprising a decorative pattern directly printed thereon, and a cured polymer layer is provided over the PVC film, wherein the decorative pattern was printed using a UV printing ink that was solvent based, and wherein the printing ink was partially dissolved in the surface of the PVC film.

2. The panel according to claim 1, wherein the polymer layer comprises a hardness gradient, so that the hardness of the polymer layer decreases essentially continuously with increasing depth as seen from the surface of the polymer layer.

3. The panel according to claim 1, wherein the printing ink used for printing the decorative pattern is a UV printing ink.

4. The panel according to claim 3, wherein the polymerizable printing ink contains a polymerizable acrylate and/or N-vinylcaprolactam.

5. The panel according to claim 4, wherein the polymerizable printing ink for printing the decorative pattern contains a polymerizable acrylate and N-vinylcaprolactam in a weight proportion in the ink of 2 to 50%.

6. The panel according to claim 1, wherein the printing ink and the polymer layer are cured together, preferably by radiation.

7. The panel according to claim 1, wherein the decorative pattern was applied by means of digital printing.

8. The panel according to claim 1, wherein the PVC film has a thickness from 0.05 to 0.15 mm.

9. The panel according to claim 1, wherein the carrier plate comprises a thickness between 3 and 20 mm.

10. The panel according to claim 1, wherein a layer comprising a UV primer is provided on the PVC film.

11. The panel according claim 10, wherein the layer comprising a UV primer has a surface mass of 1 to 15 g/m².

12. The panel according to claim 1, wherein the PVC film is glued or thermally welded to the carrier plate.

13. The panel according to claim 1, wherein the PVC film is unicoloured and in particular white.

14. The panel according to claim 1, wherein abrasion-resistant particles are provided in the polymer layer, wherein the abrasion-resistant particles preferably comprise an average diameter of 10 to 150 µm.

15. The panel according to claim 1, wherein the polymer layer base on one or more of the following acrylates: 1,6-hexane dioldiacrylate, polyester acrylate, polyurethane acrylic acid ester and dipropylene glycol diacrylate.

16. A method for manufacturing a panel, comprising the following steps in the given order:
   (i) providing a carrier plate based on polyvinyl chloride with a density of 900 to 2,500 kg/m³;
   (ii) applying a PVC film having a thickness of 0.04 to 0.2 mm to the carrier plate by means of a calender;
   (iii) printing a decorative pattern on the PVC film using a UV printing ink that is solvent based, and wherein the printing ink partially dissolves the surface of the PVC film;
   (iv) applying a first polymer layer to the PVC film;
   (v) optionally applying at least a second liquid polymer layer to the still wet first polymer layer so that a partial mixing of the polymer layers occurs; and
   (vi) curing the polymer layer(s).

17. The method according to claim 16, wherein the steps (iv) to (vi) are performed such that the cured polymer layer has a hardness gradient, wherein the hardness of the coating decreases with increasing depth as seen from the surface of the resulting coating.

18. The method according to claim 17, wherein a heated calender is used in step (ii) in such a way that the PVC film is thermally welded to the carrier plate.

19. The method according to claim 18, wherein the decorative pattern is directly printed on the PVC film by means of digital printing.

* * * * *